(12) United States Patent
Watanabe et al.

(10) Patent No.: US 12,258,078 B2
(45) Date of Patent: Mar. 25, 2025

(54) STEER-BY-WIRE STEERING SYSTEM WITH ROAD WHEEL ACTUATOR POWER LIMIT HANDLING

(71) Applicants: thyssenkrupp Presta AG, Eschen (LI); Honda Motor Co., Ltd., Tokyo (JP)

(72) Inventors: Yoshinobu Watanabe, Wako (JP); Munetsugu Hanji, Wako (JP); Hayato Miyakawa, Wako (JP); Levente Pásztor, Budapest (HU); Péter Kakas, Budapest (HU); Krisztián Dömötör, Zalaegerszeg (HU)

(73) Assignees: Thyssenkrupp Presta AG, Eschen (LI); Honda Motor Co., Ltd., Tokyo (JP)

( * ) Notice: Subject to any disclaimer, the term of this patent is extended or adjusted under 35 U.S.C. 154(b) by 244 days.

(21) Appl. No.: 17/969,018

(22) Filed: Oct. 19, 2022

(65) Prior Publication Data

US 2023/0044665 A1 Feb. 9, 2023

Related U.S. Application Data

(63) Continuation of application No. PCT/EP2020/061023, filed on Apr. 20, 2020.

(51) Int. Cl.
*B62D 5/00* (2006.01)
(52) U.S. Cl.
CPC .................... *B62D 5/006* (2013.01)
(58) Field of Classification Search
CPC ..................................................... B62D 5/006
See application file for complete search history.

(56) References Cited

U.S. PATENT DOCUMENTS

| 2006/0190151 | A1* | 8/2006 | Tsutsumi | B62D 5/0457 701/41 |
|---|---|---|---|---|
| 2019/0084614 | A1 | 3/2019 | Klein et al. | |
| 2020/0164916 | A1* | 5/2020 | Shibata | B62D 6/008 |
| 2020/0339188 | A1* | 10/2020 | Tamaizumi | B62D 5/0463 |
| 2020/0339191 | A1 | 10/2020 | Polmans et al. | |
| 2022/0185367 | A1* | 6/2022 | Namikawa | B62D 5/0463 |
| 2023/0044665 | A1* | 2/2023 | Watanabe | B62D 5/006 |

FOREIGN PATENT DOCUMENTS

| DE | 102018101181 A1 * | 7/2019 | B62D 1/04 |
|---|---|---|---|
| JP | 2007-230471 A | 9/2007 | |

OTHER PUBLICATIONS

Official Communication issued in International Patent Application No. PCT/EP2020/061023, issued on Oct. 25, 2022.
Official Communication issued in International Patent Application No. PCT/EP2020/061023, mailed on Jan. 13, 2021.

* cited by examiner

*Primary Examiner* — George C Jin
(74) *Attorney, Agent, or Firm* — Keating & Bennett, LLP

(57) ABSTRACT

A method to control a steer-by-wire steering system for a road vehicle including a steering device, a road wheel actuator to actuate road wheels, and a controller configured or programmed to generate a motor torque request for the road wheel actuator based on an actual or an estimated position and a position request, which is based on the position of the steering device, includes detecting a road wheel actuator power limit situation, modifying the position request so that it can be followed by the road wheel actuator within power limits, and using the modified position request to generate the motor torque request for the road wheel actuator.

8 Claims, 1 Drawing Sheet

STEER-BY-WIRE STEERING SYSTEM WITH ROAD WHEEL ACTUATOR POWER LIMIT HANDLING

CROSS REFERENCE TO RELATED APPLICATIONS

This application claims the benefit of priority to PCT Application No. PCT/EP2020/061023 filed on Apr. 20, 2020. The entire contents of each application are hereby incorporated herein by reference.

BACKGROUND OF THE INVENTION

1. Field of the Invention

The present invention relates to a method to control a steer-by-wire steering system of a road vehicle and to a steer-by-wire steering system for a road vehicle.

2. Description of the Related Art

In steer-by-wire steering systems, there is no mechanical connection between the steering wheel and the steering rack and the steerable wheels and steering movement is achieved by a position controlled road wheel actuator, whose reference position is based on the steering wheel angle.

The position controller always acts with motor torque such that the reference position signal is followed by the road wheel actuator. Due to physical limitations of the road wheel actuator motor (such as maximum available motor torque at a certain motor speed), and limitations of the position controller (bandwidth), the reference road wheel angle shows a transient response.

In case of high dynamic maneuvers, the transient response can cause a post steering effect. For instance, if a very fast step steer maneuver is performed on the steering wheel, the road wheels will turn during the transient, even if the maneuver on the steering wheel side has already ended. This can be felt and heard by the driver, and is very disturbing.

SUMMARY OF THE INVENTION

Preferred embodiments of the present invention provide methods to control steer-by-wire steering systems of road vehicles and steer-by-wire steering systems, each of which reduces or prevents a post steering effect.

A method to control a steer-by-wire steering system for a road vehicle is provided, the steer-by-wire steering system including a steering device (preferably a steering wheel), a road wheel actuator to actuate road wheels, and a controller configured or programmed to generate a motor torque request for the road wheel actuator based on an actual or an estimated position and a position request, which is based on a position of the steering device, the method including detecting a road wheel actuator power limit situation, modifying the position request so that it can be followed by the road wheel actuator within power limits to provide a modified position request, and using the modified position request to generate the motor torque request for the road wheel actuator.

Modifying the request to be within power limits of the road wheel actuator prevents or reduces a post steering effect.

Preferably, for the detection of a road wheel actuator power limit situation, an actual power state of an electric motor of the road wheel actuator is compared to predefined power characteristics. The predefined power characteristics can be, for example, an upper power limit or a torque limit curve.

In another preferred embodiment, position-tracking behavior of the system is monitored for the detection of a road wheel actuator power limit situation. If the road wheel actuator cannot follow the position request with a tolerance, a power limit situation is detected.

It is preferred that the modification of the position request is based on a limitation of the speed of road wheel angle change with a rate limiter.

The modification of the position request can also be based on the position deviation between the actual or estimated position and the modified position request. The modification of the position request can be tuned depending on vehicle speed. The purpose is to improve or optimize for a vehicle characteristic for each vehicle speed.

The position can be the position of the rack (in case a rack gear or a rack and pinion steering gear is present) or the road wheel angle.

Further, a steer-by-wire steering system for a road vehicle including a steering device, a road wheel actuator to actuate road wheels, and a controller configured or programmed to generate a motor torque request for the road wheel actuator based on an actual or an estimated position and a position request, which is based on a position of the steering device, is provided, wherein the controller is configured or programmed to carry out the above explained method. The road wheels can be actuated, for example, via a rack gear or a rack and pinion steering gear.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
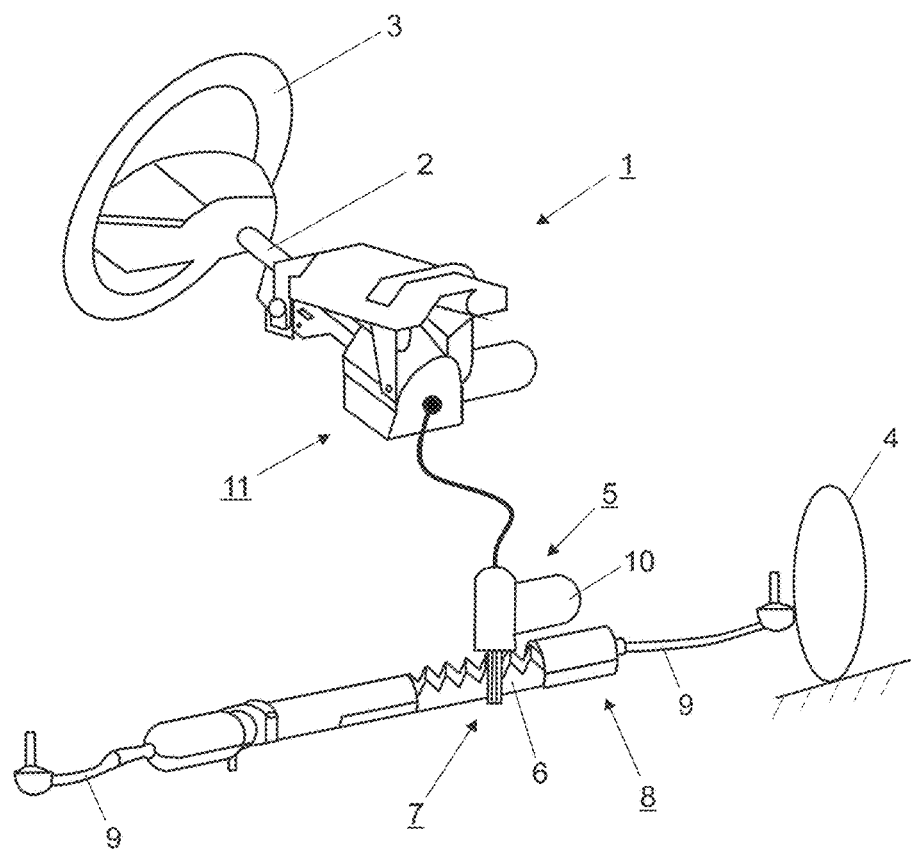
FIG. 1 is a schematic illustration of a steer-by-wire steering system of a motor vehicle.

FIG. 1 is a schematic drawing of a steer-by-wire system 1 with a steering shaft 2 connected to steering device 3. There is no mechanical connection between the steering device 3 and road wheels 4. A road wheel actuator 5 operates a gear rack 6 via a rack-and-pinion gear 7, which is part of a front wheel axle 8. The front wheel axle 8 includes two tie rods 9 for road wheels 4, of which only one road wheel 4 is shown.

When a driver operates the steering device 3, steering shaft 2 is rotated, which is detected by a shaft sensor, which is not shown in the drawings. When the vehicle is switched on, a controller 10 generates an operation signal for the road wheel actuator 5 from the signal detected by the shaft sensor. By operating gear rack 6 with the operation signal, the front wheel axle 8 is moved sideways and the road wheels 4 are turned. At the same time, forces introduced in the wheel axle 8 from the road wheels 4 are recognized by another sensor, not shown in the drawings, and a feedback signal is generated, which is applied to the steering shaft 2 by a feedback actuator 11, so that the operator can recognize the feedback in the steering device 3.

The controller 10 includes a position controller configured or programmed to generate a motor torque request based on the actual or an estimated position of the rack 6 and a requested rack position. The road wheel actuator 5 thus follows a reference position. The requested rack position is dependent on the steering wheel angle. The road wheel actuator has power limits that constrain the output torque and thus prevent damage of the electric motor. In order to avoid post steering, the following method steps are carried out. At first, a power limit situation is detected. Then as a result, the reference position is artificially modified, so that it can be followed by the road wheel actuator within the power limits. The road wheel actuator can operate at a power limit. By the time the steering wheel movement slows down, the modification leads to a deviation between the modified and actual requested road wheel angle position and the unmodified steering wheel angle based road wheel angle request. But post-steering will be significantly shorter, because the road wheel actuator can follow the reference position with a transient response. If the road wheel actuator actuates below power limits, the torque is preferably not requested, because it would lead to slowing down of the system, meaning the rack would not move as fast as it would be possible.

Figure 2:
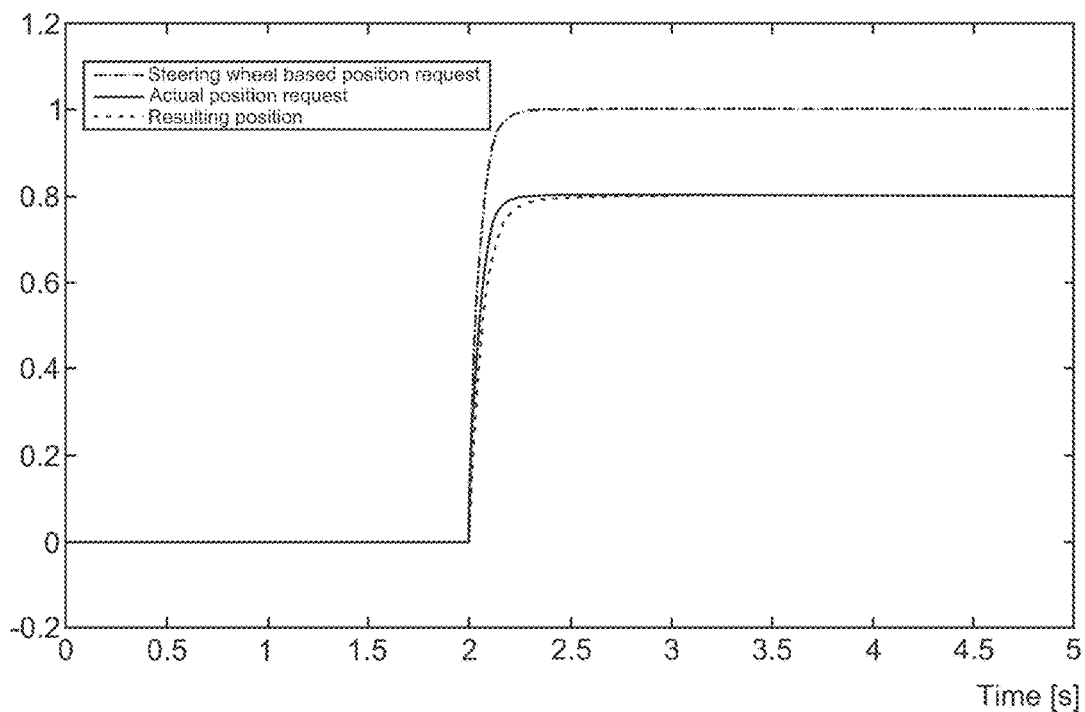
FIG. 2 shows a diagram of a step steer maneuver with modified position request.

FIG. 2 shows a diagram of a step steer maneuver between 0 and 1. The normalized positions are plotted against time. Shown are the resulting position, the modified, actual position request and the unmodified steering wheel angle based position request. The unmodified steering wheel angle based position request increases from 0 to 1 over time with a very high gradient. Just before reaching a value of 1, the curve shows a rapid but constant decrease of the gradient. The steering maneuver leads to a motor torque request which exceeds the upper power limits of the road wheel actuator. The request is thus adjusted to a modified, actual request, based on which a motor torque is calculated, which can be provided by the electric motor of the road wheel actuator within its limits. This modified, actual request is almost equal to the unmodified steering wheel angle based position request in the beginning of the steering maneuver. It flattens down to the end of the steering maneuver to a constant value of around 0.8. As can be seen from the curve of the resulting position, this modified, actual request can be followed by the road wheel actuator, limited only by the transient response. Post-steering does not occur.

For detection of a power limit situation, predefined power characteristics of the system can be used, for example, an upper power limit or a torque limit curve, that corresponds with a maximum amount of torque that could be produced by the electric motor of the road wheel actuator at any given motor speed. In order to detect a power limit situation, the actual power state of the electric motor is compared to the predefined power characteristics. A power limit situation is detected, if the limits are exceeded.

In another preferred embodiment, the position tracking behavior of the system is monitored to detect a power limit situation. If the actuator cannot follow the reference position with a tolerance, the system detects a power limit situation.

The modification of the request can be based on a limitation of the speed of road wheel angle change with a rate limiter, which results in a request below the power limit of the system. In another preferred embodiment, the modification can be tracking behavior based. In other words, the speed of road wheel angle change is slowed down by a rate, which is based on the position deviation between the actual position and the modified, actual request.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method to control a steer-by-wire steering system for a road vehicle including a steering device, a road wheel actuator to actuate road wheels, and a controller configured or programmed to generate a motor torque request for the road wheel actuator based on an actual or an estimated position and a position request, which is based on the position of the steering device, the method comprising:
   detecting a road wheel actuator power limit situation;
   modifying the position request so that it can be followed by the road wheel actuator within power limits to provide a modified position request, the modifying of the position request and a resulting speed of a road wheel angle change is based on a rate, the rate being based on a position deviation between an actual position and the modified position request; and
   using the modified position request to generate the motor torque request for the road wheel actuator.

2. The method according to claim 1, wherein for the detection of a road wheel actuator power limit situation, an actual power state of an electric motor of the road wheel actuator is compared to predefined power characteristics.

3. The method according to claim 2, wherein the predefined power characteristics include an upper power limit or a torque limit curve.

4. The method according to claim 1, wherein for the detection of a road wheel actuator power limit situation, position tracking behavior of the system is monitored and if the road wheel actuator cannot follow the position request with a tolerance, a power limit situation is detected.

5. The method according to claim 1, wherein a modification of the position request is based on a limitation of a speed of a road wheel angle change with a rate limiter.

6. The method according to claim 1, wherein the position is a position of a rack or a road wheel angle.

7. A steer-by-wire steering system for a road vehicle comprising:
   a steering device;
   a road wheel actuator to actuate road wheels; and
   a controller configured or programmed to generate a motor torque request for the road wheel actuator based on an actual or an estimated position and a position request, which is based on a position of the steering device; wherein
   the controller is configured or programmed to carry out the method according to claim 1.

8. The method according to claim 1, wherein the modified position request is tuned based on the position deviation between the actual position and the modified position request to define the speed of the road wheel angle change.

* * * * *